Sept. 30, 1941.   N. E. WAHLBERG ET AL   2,257,630
MOTOR MOUNTING
Filed May 3, 1939   2 Sheets-Sheet 1
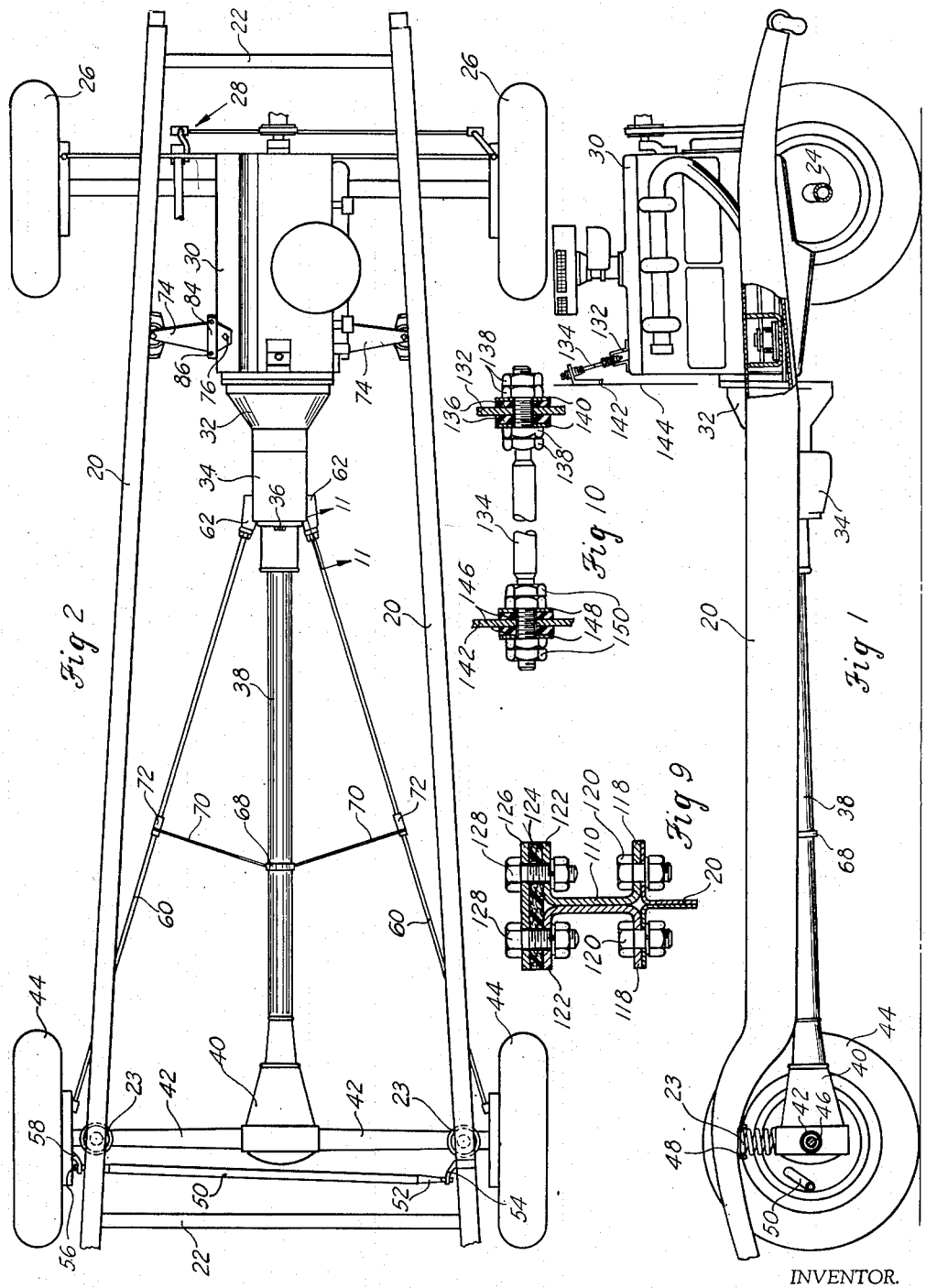
INVENTOR.
NILS ERIK WAHLBERG
MEADE F. MOORE
BY Carl J. Barbee ATTORNEY.

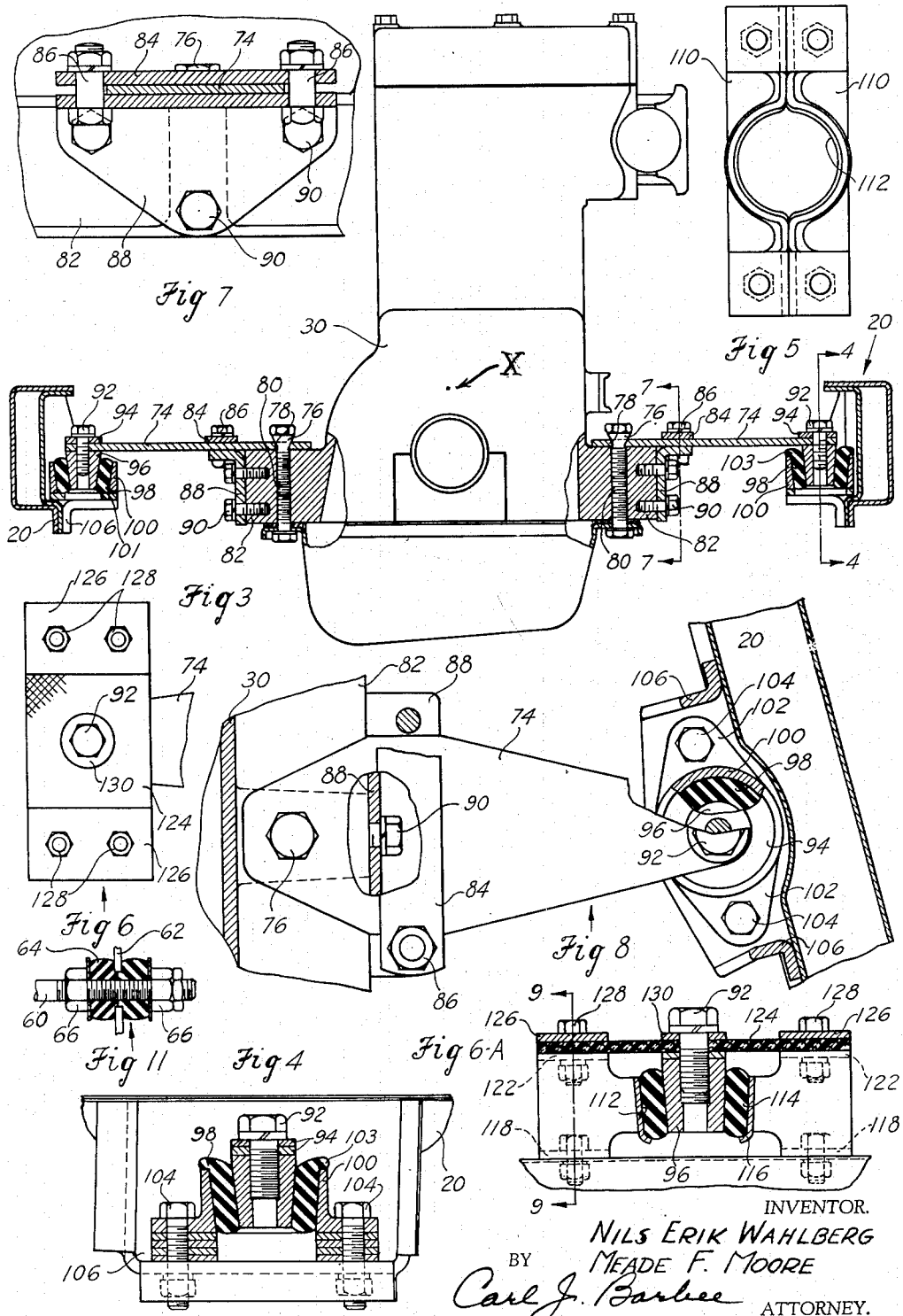

Patented Sept. 30, 1941

2,257,630

UNITED STATES PATENT OFFICE 2,257,630

MOTOR MOUNTING

Nils Erik Wahlberg and Meade F. Moore, Kenosha, Wis., assignors to Nash-Kelvinator Corporation, Kenosha, Wis., a corporation of Maryland Application May 3, 1939, Serial No. 271,464

15 Claims. (Cl. 180—57)

This invention relates to motor mountings and more particularly to motor mounts of the tractor type in automotive vehicles.

Most automotive vehicles, which are manufactured at the present time, comprise a frame upon which the body of the vehicle is mounted, this frame being supplied with motor supporting brackets to which the motor is connected by some type of resilient connection in order to permit the motor to move in a limited degree with respect to the frame because of the reaction to the explosions occurring within the motor. Such constructions generally require that the motor be supported at three or more points from the frame, and also require that the vibration of the motor due to the explosions therein be transmitted to and eventually absorbed within the frame of the vehicle. This is true even though the assembly is provided with means for absorbing or cushioning the vibration of the motor, such absorbing or cushioning means serving only to dampen or diminish the violence of the vibration.

For these reasons frames in the past have been constructed of relatively heavy material and have been relatively massive in their proportions in order to withstand the shock and the fatigue factors which are present.

It is an object of the invention to mount the power plant of an automotive vehicle upon a frame in such a manner that none of the torque reaction from the motor is conveyed to the frame, such torque reaction being dissipated through the drive unit to the driving wheels and thus to the ground.

An additional object of the invention is to provide a motor mount which will permit the motor to oscillate due to its torque reaction, the motor being rigidly connected through a torque tube to the rear axle for dissipating the torque reaction and the motor mount being so constructed as to permit transmission of the driving force from the rear wheels through the torque tube to the frame.

An additional object of the invention is to provide a construction of motor mount which will permit a reduction in weight of the frame members and a reduction in size of the frame construction by decreasing the shock which the frame must absorb, such shock diminution being brought about by the method of mounting the power unit upon the frame.

A still further object of the invention is to simplify the construction of an automotive vehicle whereby the vehicle may be substantially completed in two units, the units brought together and a few simple connections made to complete the vehicle.

Further objects and advantages will appear hereinafter as the description proceeds and will be pointed out more fully in connection with the appended claims.

In the accompanying drawings of which there are two sheets and which are to be taken as illustrative rather than as limiting the invention:

Figure 1 is a side elevational view of a frame and power unit for an automotive vehicle, parts being broken away and shown in section in order more clearly to illustrate the invention;

Figure 2 is a plan view of the parts shown in Figure 1;

Figure 3 is a front elevational view of the motor shown in Figures 1 and 2, details of its connection or mounting upon the frame or sill being shown in cross-section;

Figure 4 is a vertical longitudinal sectional view of a frame supported mounting unit taken substantially upon a plane as indicated by the line 4—4 of Figure 3;

Figure 5 is a plan view of a modified form of mounting member;

Figure 6 is a plan view of the mounting unit shown in Figure 5 but with the dampening strips in place;

Figure 6A is a vertical sectional view through the mounting shown in Figure 6;

Figure 7 is a vertical sectional view through the connection of the supporting spring to the motor, taken substantially upon a plane as indicated by the line 7—7 of Figure 3 and looking in the direction of the arrows;

Figure 8 is a plan view of that form of frame connection shown upon the left of Figure 3, certain parts being broken away in order more clearly to illustrate the invention;

Figure 9 is a vertical sectional view through the motor supporting frame bracket shown in Figure 6A and taken substantially upon a plane as indicated by the line 9—9 of Figure 6A looking in the direction of the arrows;

Figure 10 is a sectional view through the stabilizer brackets and rod shown upon the upper portion of the motor in Figure 1; and Figure 11 is a partial sectional view through the stay rod connection at the motor.

Referring more specifically to the drawings, it will be recognized that the invention resides in a power unit and its assembly with the frame of an automotive vehicle. All power units produce as a result of the vehicle drive torque an oppositely directed reaction of equal amplitude to the drive torque, and it consequently becomes necessary to brace the motor against this reaction and in some way to absorb or dissipate the reaction. In the present construction the means for bracing the motor against this reaction is illustrated as comprising a rigid drive unit in which the motor block, the clutch housing, the transmission housing, the torque tube, and the rear axle are connected solidly together to operate as a unit, the motor being supported from the frame by means which permit the unit to oscillate freely within the frame so that the vibrations are transmitted through the unit to the drive wheels. This type of construction, of course, creates a large number of special problems which will be dealt with as the description proceeds.

The invention is illustrated as comprising an automotive vehicle which has a body (not shown) which may be mounted upon or originally constructed integral with a frame composed of longitudinally extending members 20 and transverse front and rear strengthening members 22, the longitudinal frame members 20, as will be apparent from the inspection of Figure 3, being made up of a double inwardly presented channel section. The frame members 20 provide supports for rear springs, such as 23 (Figures 1 and 2), and front springs (not shown) for supporting the front axle 24 which carries the usual king pin and front wheel spindle (not shown) upon which the front wheels 26 are supported. A steering mechanism indicated generally at 28 is connected to the front wheels for steering the vehicle.

The motor 30 is mounted adjacent the front of the frame members 20 and therebetween upon supports to be hereinafter described. To the rear of the motor 30 there is secured either by being cast integral with the motor or by suitable rigid connections thereto, a clutch housing 32 and a transmission housing 34. The rear end of the transmission housing 34 has rigidly secured thereto as by bolts 36 a torque tube 38 through which the usual propeller shaft (not shown) extends. The opposite end of the torque tube has rigidly secured thereto a differential housing 40 to which are attached tubular rear axle members 42 extending to the wheels 44 on opposite sides of the differential housing 40 and containing rear drive axles 46 for rotating the wheels 44. The tubular axles 42 are provided adjacent the frame member 20 with seats (not shown) for receiving one end of the coil springs 23, the opposite ends thereof being received within a seat 48 provided upon the underside of the frame member 20. In order to prevent movement of the rear axle in a sidewise direction with respect to the frame because of the coil spring suspension, a stabilizer or stay bar 50 is provided. The stay bar 50 has one end 52 secured by cushioned connectors to a bracket 54 tight with the longitudinal frame member 20, the opposite end 56 thereof having a resilient connection with a bracket 58 fast upon the brake backing plate (not shown) which is rigid with the tubular axle 42. It will be recognized that this construction permits the rear axle to ride freely up and down or permits the same to tilt as when one wheel or both wheels pass over a bump or obstruction in the road, but that any motion of the unit toward one side or the other is prevented. It should be noted that the resilient connections at 52 and 56 are of such a nature that the stay bar 50 may have limited pivotal movement with respect to the brackets 54 and 58.

Also secured to the brake backing plates are stay rods 60 which converge forwardly and are secured at their forward ends to brackets 62 formed upon the transmission housing 34. Brackets 62 (see Figure 11) are provided with an aperture through which the stay rod 60 extends. Upon opposite sides of the bracket 62 the stay rod 60 receives a rubber cushioning member 64 which is held compressed against the bracket 62 by means of nuts 66. By these instrumentalities it is possible to adjust the rods 60 to any degree of tightness so as to insure that they will always be in tension. The central portion of the rods 60 may be braced by means of a fixture 68 fast upon the torque tube 38 and having arms 70 rigidly clamped at 72 to the rod 60 in order to prevent their vibration and to increase the effectiveness of their bracing actions.

The motor 30 is supported from the frame by means of two leaf springs 74, one of which is positioned at each side of the motor and adjacent the rear end thereof. Referring to Figure 3, the leaf spring 74 is illustrated as rigidly secured to the motor block 30 by means of a conical headed screw 76 received within a conical aperture 78 in the spring 74 and threaded into a tapped aperture 80 in a boss 82 of the motor block. The spring 74 is also clamped by means of a plate 84 and bolts 86 to a bracket 88 secured by means of screws 90 threaded into tapped apertures in the boss 82.

The outer ends of the springs 74 are apertured to receive bolts 92, the heads of which are spaced from the spring 74 by means of a washer 94 and the shanks of which are threadedly received within frusto-conical pins 96. Rubber members 98 encircle the pins 96 and are confined within a cup member 100 which is frusto-conical in shape and similar to the pin 96 but slightly larger than such pin so as to confine the rubber member 98. The cup 100 in the modification shown upon the left side of Figure 3 and Figure 8 comprises a forged element, the inside surface of which has the frusto-conical shape above described and which is provided with laterally extending flanges 102 (see Figure 8) apertured to receive bolts 104 for securing the cup 100 to a bracket 106 which may be welded or otherwise suitably secured to the longitudinal frame forming members 20.

When the motor is in operation with the crank shaft transmitting force through the propeller shaft to the rear wheels, the reaction to the driving force manifests itself in an attempt of the motor to rotate in a direction opposite to the direction of rotation of the crank shaft. Each explosion occurring within the motor will tend thus to rotate the motor. The springs 74 are provided to permit a limited amount of such rotation of the motor as the explosions occur. The springs 74 may flex to permit a portion of the motor rotation, and the rubber member 98 confined between the pin 96 and cup 100 functions to permit an additional portion of the rotation. Assuming that the motor is oscillating to the right or in a clockwise direction about its center of oscillation X (Figure 3), the left spring 74 will become bowed upwardly and will thus shorten the distance between the motor and the frame partially due to the fact that the lower portion of the motor 30 in moving about the center of oscillation X must move toward the frame and partially because the upward movement of the boss 82 will bend the spring 74 and will shorten the distance between the bolts 86 and 92. The upward bowing of the spring 74 will also result in the pin 96 being twisted or tilted within the cup 100, the rubber member 98 being compressed adjacent the lower right hand portion and the upper left hand portion thereof, as viewed in Figure 3, the pressures upon the rubber member being relieved adjacent the upper right hand portion and the lower left hand portion, as viewed in Figure 3. The rubber which is displaced at the two points of compression may flow toward the points where the pressure is relieved.

The center of oscillation of the motor may be located by varying the height of the pin and cup with respect to the leaf spring and noting in which location the motor oscillates most smoothly. It will be appreciated that the center of oscillation X is fixed due to the characteristics inherent in a motor, but that this point should vary between different types of motors. It is, therefore, only necessary to attach the spring in the vertical transverse plane of the theoretical center of oscillation of the motor and to determine the proper vertical location of the pin and cup structure with respect to the leaf spring experimentally by adding spacing washers above and below the free end of the leaf spring.

It will be noted further that the coil springs 22 which support the frame 20 from the rear axle are not capable of transmitting force from the rear axle to the frame for driving a vehicle either forward or in reverse, and accordingly it is necessary that all of the force which is transmitted to the frame from the rear or driving wheels 44 pass through the motor mount. Although the leaf springs 74 are relatively flexible so as to permit rotation of the driving unit about an axis which extends longitudinally, they constitute cantilever beams for the transmission of forces directed along the torque tube 38 and in transmitting such forces from the motor block to the frame. It will be noted that the springs 74 are relatively stiff about a vertical axis and will easily transmit any driving force imparted to them to the frame 20. Accordingly, all of the force for driving the vehicle forwardly is transmitted to the frame at the forward portion thereof and results in all of the frame being in tension to pull the vehicle along when it is in forward motion. It is well known that better designs of structural members result when all or most of such members are under a tensile rather than a compressive stress. In the usual automotive vehicle the driving force is transmitted to the vehicle at the rear thereof so that entire frame is in compression and must needs be much stronger to prevent buckling of the parts than where the frame is in tension as in the present construction.

The motor mounting also permits the rear wheels to ride vertically either together or singly by reason of the rubber mounting between the pin 96 and cup 100 and the spring 74. Should both of the rear wheels encounter an obstruction in the road, the drive unit will simply tilt around a transverse horizontal axis extending through the central portion of the pin and cup mounting, such tilting movement being permitted by reason of the flow characteristics of the rubber member 98 as it is displaced by the pin and mating cup and the flexing of the springs 74. In the event that only one of the driving wheels 44 encounters an obstruction, the driving unit may tilt about the center of oscillation of the motor in very much the same manner as the motor oscillates about its center of oscillation due to the torque reaction thereof except that the center of oscillation may be shifted upwardly slightly by this movement.

The above description applies back to the construction shown upon the left and upon the right of Figure 3, that shown upon the right of Figure 3 representing a modification of the cup 100 and the rubber cushion 98. It will be noted that the cup does not have the inwardly extending flange 101 which is present on the left mounting and that the rubber cushion is provided with a lip 103 which engages the top of the cup. It is contemplated that either one or both of these constructions may be employed to prevent downward displacement of the rubber member 98 within the cup 100.

The modified form of pin and cup connection is shown in Figures 5, 6, 6A, and 9. In this modification the cup is formed from a pair of stampings 110, the central portion of which is of generally hollow semi-frusto-conical shape so that when these two stampings are brought together they form a complete frusto-conical socket 112 within which the rubber cushion 114 is received. The lower edge of the socket 112 is curled inwardly as at 116 to provide a lip which limits downward movement of the rubber member 114 when it is positioned in the cup. It will, of course, be understood that the stamped members 110 are provided with outwardly turned flanges 118 at their front and rear bottom portions through which bolts 120 may be passed to secure the stamped members 110 to the side sill 20. Similar flanges 122 are provided upon the upper front and rear portions of the stamped members 110, and these flanges 122 provide a seat for a rubberized fabric member 124 which is secured to such upper flanges 122 by means of plates 126 and bolts 128. The central portion of the rubberized fabric 124 is secured between the head on the bolt 92 and the upper surface of the pin 96, and is tightly clamped by means of washers 130 lying upon opposite sides of the member 124.

The member 124 serves as a dampening element for preventing excessive movement of the motor and its mounting elements with respect to the frame. It will be noted that the movement of the pin 96 will be restrained not only by the rubber cushion member 114 but also by the rubber and fabric dampening element 124 which operates in all directions as the motor swings from side to side or tilts about a horizontal axis. The dampening element 124 also operates to prevent withdrawal of the pin 96 from the cup 112 when a violent shock occurs as is conceivable in the case of a collision or upset of the vehicle.

A still further dampening element is employed in connection with the vehicle and comprises a bracket 132 which is secured to the upper rear surface of the motor 30 by any suitable means (see Figures 1 and 10). The bracket 132 is apertured to receive the lower end of a rod 134 which is provided with cushioned elements 136 upon opposite sides of the bracket 132, such cushioned elements being compressed against the bracket 132 by means of nuts 138 threaded onto the rod 134 and engaging washers 140. The upper end of the rod 134 projects through an aperture in a bracket 142 which is rigidly connected to the dash 144 of the vehicle. The rod 134 at its upper end is also provided with rubber washers 146 which are clamped against the bracket 142 on opposite sides thereof by means of washers 148 and nuts 150.

It will be recognized that the stabilizing rod 134 has little or no effect upon the oscillation of the motor 30 as long as the oscillation remains near the midpoint of the engine vibration and as long as the vertical movement of the rear axle 42 is not excessive. This is so by reason of the angular arrangement of the stay rod 134 which passes between surfaces upon the brackets 142 and 132 which are arranged approximately normal to an arc extending from the center of oscillation of the motor unit. Any slight vibration which occurs between the motor unit and the body, as represented by the brackets 132 and 142, is permitted to take place because of the resilient connection of the rod 134 with the brackets 132 and 142. When the vibration in any direction becomes excessive, the limits of compression or compressibility of the rubber washers 136 and 146 are exceeded, and they accordingly act to prevent vibration or movement of the engine beyond these limits. These limits may, of course, be predetermined by adjusting the degree of initial compression of the washers 136 and 146. If the washers are relatively loose and uncompressed, a greater degree of displacement of the engine will be permitted by the stay bar 134 before it becomes active to suppress vibration; whereas if the washers 136 and 146 are compressed, a relative small amount of free oscillation will be permitted the motor 30 prior to a controlling force being exerted thereupon by the stay bar 134.

It will thus be seen that there has been provided a motor mounting which has all of the advantages and accomplishes all of the objects set forth in the foregoing specification.

Although the invention has been described with considerable detail, changes may be made in the structure disclosed without departing from the spirit of the invention.

We claim:

1. A motor vehicle comprising an engine unit, a torque tube rigidly secured to said engine unit, a rear axle rigidly secured to said torque tube and supporting vehicle driving wheels, a frame for the vehicle, means for supporting the engine and driving unit from the frame including a plurality of horizontally extending leaf springs rigidly secured to the engine and having conical shaped pins secured to the free ends thereof, conical cup members supported on said frame and around said pins, and resilient cushion members positioned between said pins and cup shaped members.

2. In a drive unit in which a motor, a torque tube and a rear axle are rigidly connected to form a T-frame, a vehicle frame, means for supporting the motor from the frame of the vehicle including a pair of flat horizontally extending leaf springs having their inner ends rigidly secured to the motor and having their outer ends provided with pins received in cups supported from the frame, said pins and cups being spaced from one another by means of resilient cushion elements.

3. A motor mounting for an internal combustion engine comprising flat leaf springs rigidly connected at one end to an internal combustion engine and having secured to their opposite ends conical pins, a vehicle frame, said conical pins being received within conical cups supported upon the frame of the vehicle, said pins and cups being spaced from one another and maintained in position by means of a non-metallic resilient member.

4. A support for an internal combustion engine comprising flat leaf springs secured to said internal combustion engine and projecting laterally therefrom to a position adjacent a frame, cup elements supported from said frame and having an internal frusto-conical shape, rubber cushioning elements positioned within said cup elements and having an external configuration similar to that of said cup elements, said cushioning elements having an internal frusto-conical configuration similar to their external configuration but of smaller diameter throughout, and pins secured to the free ends of said springs and having an external configuration corresponding to the internal configuration of said cushioning elements and received therein.

5. In a motor vehicle assembly, a plurality of wheels, a frame supported by said wheels, an engine, a rear axle mounting said wheels, a shaft forming a driving connection between said engine and said rear axle without any universal joint between them, braces extending between said rear axle and said engine for rigidly interconnecting the two, and mounting means for supporting said engine from said chassis frame and including leaf springs having conical pins thereon and non-metallic resilient elements arranged in series to prevent transmission of motor vibrations to said frame.

6. In a motor vehicle assembly, a plurality of wheels, a chassis frame supported by said wheels, an engine, a drive axle mounting said wheels, a shaft forming a drive connection between said engine and said drive axle without any universal joint between them, and means mounting said engine upon said frame and including transverse springs with conical pins thereon and non-metallic resilient cup shaped members arranged in series to prevent the transmission of engine vibrations to said frame.

7. A motor vehicle comprising a rigid drive axle, a torque tube, and a motor unit, a frame, said drive axle mounting driving wheels and resiliently supporting the frame therefrom, and means including leaf springs having pins on the free ends thereof and resilient non-metallic cushioning elements defining conical pockets arranged in series for supporting said motor unit from the frame.

8. An automotive vehicle comprising a frame, an internal combustion engine, transverse leaf springs rigidly secured to said engine and having laterally extending free ends, pins connected to said free ends and received within cups mounted upon the frame, rubber washers surrounding said pins and within said cups, and vibration dampening elements including resilient material normally unstressed extending between said pins and said cups.

9. A motor mounting comprising a motor, a vehicle frame, a cup supported by the frame, a projection secured to the motor and extending into said cup, a non-metallic resilient washer interposed between said cup and said projection, and a strip of rubberized fabric secured to said cup and to said projection and extending therebetween in normally unstressed condition, said strip being adapted to be stressed to oppose oscillations between said cup and projection.

10. A motor mounting comprising a motor, a vehicle frame, a cup supported by said frame and having a frusto-conical cavity, a frusto-conical projection upon said motor similar in shape but smaller than said cavity and projecting thereinto, a rubber cushion interposed between said projection and cup and having inside and outside surfaces corresponding to and in engagement with the frusto-conical surfaces of said projection and said cup, respectively, and a rubber impregnated fabric strip secured to and between said projection and a portion of said cup.

11. A motor mounting comprising a motor, a vehicle frame, a cup supported by said frame and having a cavity, a projection upon said motor similar in shape but smaller than said cavity and projecting thereinto, a rubber cushion interposed between said projection and cup and having inside and outside surfaces corresponding to and in engagement with the opposed surfaces of said projection and cup, a rubber impregnated fabric strip having an intermediate portion thereof attached to said projection, and means upon opposite sides of said cup attaching the extremities of said strip to said cup.

12. A motor mounting comprising a frame, a motor, a leaf spring having one end rigidly secured to said motor and the opposite end provided with a pin, a rubber cushion surrounding and supporting said pin, and means supporting said cushion from said frame.

13. A motor mounting comprising leaf springs having one end rigidly secured to said motor at spaced points, metallic members carried on the free ends of said springs, a frame, receptacles carried by said frame adjacent the free ends of said springs, and rubber cushions within said receptacles embracing said metallic members and shaped to conform to the outer surface of the metallic members and the inner surface of the receptacles to hold said parts in spaced apart insulated relation.

14. A motor vehicle comprising a drive unit and a frame, said drive unit including an engine, drive wheels supported by a driving axle, a shaft forming a drive connection between said engine and said drive axle without any universal joint between them, and means including leaf springs secured to said engine and having conical shaped pins supported in rubber cushions supported from said frame, said leaf springs and cushions comprising the entire support for the engine and the only driving connection between the frame and drive unit.

15. A motor vehicle comprising a frame, a motor, a driving axle, drive connections between said motor and driving axle including a propeller shaft, a torque tube rigidly secured to said driving axle and extending to said motor for transmitting forward driving force of the rear axle to said motor, and motor mounting means including deformable rubber mountings defining conical apertures, and leaf springs having conical shaped pins thereon received in said conical apertures for supporting the weight of said motor and permitting said motor to rock about its axis of oscillation, said mountings being supported upon said frame and cooperating therewith to transmit the forward driving force from the motor to the frame.

NILS ERIK WAHLBERG.
MEADE F. MOORE.